Patented May 11, 1926.

1,584,202

UNITED STATES PATENT OFFICE.

ERNST THEOBALD, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

COLORING-MATTER PASTE.

No Drawing. Application filed June 8, 1925. Serial No. 35,787.

My present invention relates to organic coloring matters in paste form which latter is often preferred by reason of its containing the coloring matter in a state of fine division in which the coloring matter, when a vat dyestuff, readily dissolves in the vat. Such pastes however often possess the undesirable property of allowing the coloring matter to settle, either wholly or partly, when stored for a greater or shorter length of time, forming a thick or tough sticky deposit which it is very difficult to make again into a homogeneous paste.

I have discovered that the said sticky deposits of the pastes can be prevented and the process of depositing can be retarded or also prevented by adding to the coloring matter paste a small amount of a permanganate which decomposes in the paste with a precipitation of insoluble manganese compounds, chiefly oxids. The invention is more fully explained by the following examples, which however, are only typical and to which the invention is not restricted. The parts are by weight.

Example 1.

500 parts of indanthrene orange RRT 10 per cent paste are thoroughly mixed by stirring with a strong aqueous solution of 0.25 part of potassium permanganate. The homogeneous suspension resulting thereby keeps unaltered for a very long time; at most a moderate settling occurs but no formation of a sticky deposit.

Example 2.

500 parts of indanthrene blue RS 10 per cent paste are well mixed with a concentrated solution of 0.5 parts of potassium permanganate. The paste so treated can be readily stirred to again form a homogeneous suspension after standing for any length of time, while without the addition of permanganate a sticky deposit is often formed on standing.

Example 3.

500 parts of indigo RB 40 per cent paste is well stirred with an addition of a strong aqueous solution of 1 part of potassium permanganate, the effect being similar to that described in the foregoing examples.

With pastes of other vat coloring matters and with other permanganates the process is carried out in a similar manner, the most suitable proportions varying within a restricted range and being ascertained in each case without difficulty.

What I claim is:

1. As new articles of manufacture, organic coloring matters, insoluble in water, in the form of an aqueous paste containing a small amount of precipitated manganese compounds.

2. The process of manufacturing improved pastes of organic vat coloring matters which consists in adding to an aqueous vat dyestuff paste a small amount of a soluble permanganate.

In testimony whereof I have hereunto set my hand.

ERNST THEOBALD.